United States Patent Office 3,128,173
Patented Apr. 7, 1964

3,128,173
MAGNETIZATION OF IRON ORES
Ralph R. Gresham, P.O. Box 217, Brighton, Colo.
No Drawing. Filed Jan. 30, 1961, Ser. No. 85,478
4 Claims. (Cl. 75—1)

This invention relates to the problems and practices of ore concentration, and more particularly to the difficulties and complications peculiar to the concentration of low-grade iron ores, and has as an object to provide a novel and improved method applicable with facility and economy to condition relatively-abundant iron ores of low grade for efficient concentration and high recovery of their value factors.

A further object of the invention is to provide a novel and improved method practicable at the site of ore production to condition low-grade iron ores for efficient concentration and recovery of their value factors.

A further object of the invention is to provide a novel and improved method convenient and economical of practice at the site of ore production to condition low-grade iron ores for efficient value factor recovery through conventional concentrating and separating techniques.

A further object of the invention is to provide a novel and improved method for the magnetization of naturally non-magnetic value constituents of low-grade iron ores.

A further object of the invention is to provide a novel and improved method for the magnetization of naturally non-magnetic constituents of low grade iron ores with consequent conditioning of the ore for efficient concentration and recovery of its value factors.

A further object of the invention is to provide a novel and improved method for the magnetization of naturally non-magnetic constituents of low-grade iron ores which is amenable to economical and efficient practice at the site of ore production through diverse and readily-available apparatus of nominal cost and low operating expense.

A further object of the invention is to provide a novel and improved method for the magnetization of naturally non-magnetic constituents of low-grade iron ores that is susceptible of continuous, as distinguished from intermittent, practice with consequent enhanced economic advantage.

With the foregoing and other objects in view, my invention consists in the nature, correlation, and sequential relation of method steps as hereinafter set forth and pointed out in my claims.

The rapid depletion of high-grade iron ores appropriate for economical transportation and smelting in their natural state has directed increasing attention to the ores of low iron content and to the consequent problems of conditioning and concentrating the ore for the upgrading thereof essential to its practical industrial use. The established practices applicable to the concentration of iron ores are very largely effective in reliance upon natural properties of the iron oxides characterizing the ore; both gravity and magnetic methods of iron ore concentration being recognized and utilized by reason of their efficiency when applied to ores, notably magnetite, whereof the iron oxides are of high density appropriate for gravity separation and also magnetically responsive for reaction to magnetic separation processes.

The known reserves of magnetite have diminished to the point where reliance must be placed upon supplies of low-grade ores, such as hematites, known to be abundant, but the iron oxides of the low-grade ores are not amenable to separation by conventional methods, are expensive of separation by hitherto-known methods and processes, and represent such low proportion in their native ores as to preclude, for reasons of expense, their use as a source of industrial iron unless concentrated at the site of ore production. It being manifest that conversion of the iron oxides characteristic of hematite, or other, low-grade iron ores to the oxide form distinguishing the magnetite ores would condition the low-grade ores for effective and economical concentration at the site of ore production, this invention is hence directed to the provision of a novel and improved method for the efficient attainment of such conversion.

The iron components of the relatively-abundant, low-grade hematite and martite ores are ferric oxides, $Fe_2O_3$, not normally magnetically responsive and resistant to economic separation from the associated gangue by conventional methods appropriate for practice at the site of ore production, while the iron components of the magnetite ores are ferriferrous oxides, $Fe_3O_4$, or $FeO.Fe_2O_3$, or $Fe:(FeO_2)_2$, which are magnetically responsive and amenable to efficient separation from the gangue of the ore by conventional methods, either gravity or magnetic, expedient of practice as a concomitant to production of the ore. It has been determined that the ferric oxides of native hematite and analogous ores feasibly may be brought to the lower stage of oxidation distinguishing the ferriferrous oxides and to a manifestation of the properties and characteristics peculiar to the latter through exposure of the ferric oxide ores in a state of suitable comminution to a controlled reducing action incident to combustion, and the instant invention provides a simple and practical method of effecting such conversion of the iron oxides that is suited for economic practice.

In common with conventional ore treatment preliminary to concentration thereof and separation of value factors therefrom, the hematite and analogous ores are first crushed, ground, or otherwise disintegrated to a practical degree of fineness economically appropriate to condition the material for desired reaction to the treatment hereinafter described, which degree of fineness will necessarily vary with the differences evidenced by particular ores. In the case of certain hematites successfully concentrated by the improved method, a grind of the ore to pass four mesh screens proved to be fully adequate to effectuate the purposes of the invention, while an ore from a different location required a grind to pass much finer screens for satisfactory reaction to subsequent treatment, it being reasonably apparent that a range of ore comminution between that which will pass a four mesh screen and a fineness to pass two hundred mesh screens will suffice to prepare most, if not all, native hematite and similar iron ores for satisfactory reaction to the method of the invention. Considerations of economy naturally establish as optimum that degree of ore comminution adequate with a minimum of pulverulence to expose the iron oxide ore components to subsequent processing, and it is obvious that disintegration of the ore to the appropriate degree of fineness may be, as is usual, a continuous operation performed at the site of ore production by means of conventional milling equipment and facilitates of established capabilities.

A first distinctive step of the improved method is that of combining as an intermixture with the suitably-ground ore proportioned amounts of highly-combustible additives of expediently-available nature and effective solid, liquid, or gaseous form. Solid form additives useful for realization of the objectives of the invention are ordinary fuels in granular form, such as sawdust, ground coal, ground coke, and the like, any of which in a particle size amenable to the techniques characterizing the invention will effectuate practice of the improved method when introduced to the ground ore in the approximate proportion, by volume, of one part of the fuel additive to ten parts of the ore and mixed to uniform dispersion therein. Proportioned combination and intermixing of the granular fuel and ground ore are expediently continuous operations susceptible of accomplishment by conventional means and instrumentalities in advance of and separately from the next subsequent method step, any ordinary type of dry-mixing apparatus being adequate to achieve satisfactory blending of the fuel with the ore. Liquid form fuel additives found to be suitable for practice of the invention include fuel oil, kerosense, naptha, solvent, and the like, in the proportion, by weight, of one part of the liquid fuel to one hundred parts of the ore. The liquid fuel is manifestly amenable to combination with the ore in a continuous operation performed by conventional apparatus effective to agitate the ore into thorough, intimate contact with the liquid spray-delivered or otherwise applied thereto; it being practical and obviously desirable that the combination of the liquid fuel with the ore be made concurrently with and immediately prior to the next subsequent step of the method. Combustible gas fuels employable within the contemplation of the invention in substitution for the solid and liquid fuels above discussed are effectively combinable with the ground ore as a phase of a continuous operation only as the material enters the combustion stage next in the method sequence, proportioning of the combustible gas supply to the ore being necessarily variable in such adjustment to the nature and properties of the diverse available gases as will promote and sustain the character and intensity of combustion featuring the ensuing step of the method.

In appropriate proportioned admixture with a solid, liquid, or gaseous fuel, as above discussed, the ground ore is subjected to the direct action of flame emanating from a suitable burner or furnace, conventional or other, in a manner to establish repetitious, intimate exposure of the mixture particles to contact with flame in an environment closed to the admission of atmospheric air. The ore and fuel mixture may be infed to the flame from above, or otherwise, for reception in apparatus, such as a furnace, of any structural particularity operable to continuously translate the material therethrough in maintained dispersion and repetitious particle exposure to the flame, whereby to effect ignition and combustion of the fuel component of the admixture with consequent reduction of the ferric oxides and conversion thereof to ferriferrous oxide form. Essential to reduction and conversion of the ferric oxides in accordance with the principles of the invention is a furnace arrangement wherein the zone of combustion is of maintained reducing character and control of the temperature obtaining within the combustion zone at a range of 750° F. to 1400° F. preclusive of sintering effect upon the ore materials and below the fusion point of the ore constituents, between which temperature limits a transit of the ore subject to such heat treatment for a time period of from thirty seconds to two minutes is sufficient to reduce substantially all of the ferric oxides of the native ore to ferriferous forms characterized by magnetically reactive properties.

The heat treatment of the ore accomplished as above explained concludes practice of the improved method with realization of the purposes of the invention, the discharge from the heat treatment step being a granular admixture of ferriferrous oxides, or magnetite, and the gangue of the original ore in substantially the particle size of the initial admixture and in a form for concentration and recovery of the value factors thereof through conventional processes of established economic practicality.

Typical of the techniques employed and the results obtained in application of the improved method to the intended conditioning of low-grade iron ores, the following specific examples affirm the merit and economic feasibility of the novel treatment above described.

Example 1.—A completely non-magnetic limonite ore assaying 31.8% iron (Fe) ground to pass a ten mesh screen was thoroughly admixed dry with ten percent, by volume, of sawdust and the resulting mixture was fed to the flaming interior of a gas-fired, rotary furnace turning at twenty revolutions per minute about an axis at an angle of some fifteen degrees to the horizontal. Introduced from above to the higher end of the furnace and to the direct influence of the flame therewithin, the mixture infeed was agitated as an incident of flash combustion during some thirty seconds of transit through the furnace subject to a temperature on the order of one thousand degrees F. The discharge from the furnace proved to be magnetically responsive and was processed through a magnetic separator with recovery of a concentrate assaying 60.65% iron (Fe).

Example 2.—A completely oxidized and non-magnetic hematite ore assaying 51.3% iron (Fe) ground to pass a twenty mesh screen was thoroughly admixed dry with ten percent, by volume, of sawdust and the resulting mixture was fed to the flaming interior of a gas-fired, rotary furnace turning at twenty revolutions per minute about an axis at an angle of some fifteen degrees to the horizontal. Introduced from above to the higher end of the furnace and to the direct influence of the flame therewithin, the mixture infeed was agitated as an incident of flash combustion during some thirty seconds of transit through the furnace subject to a temperature on the order of one thousand degrees F. The discharge from the furnace proved to be magnetically responsive and was processed through a magnetic separator with recovery of a concentrate assaying 59.6% iron (Fe).

Example 3.—A completely non-magnetic hematite ore collected as tailings from a gravity washing mill assaying 26.85% iron (Fe) and ground to pass a ten mesh screen was thoroughly admixed dry with ten percent, by volume, of sawdust and the resulting mixture was fed to the flaming interior of a gas-fired, rotary furnace turning at twenty revolutions per minute about an axis at an angle of some fifteen degrees to the horizontal. Introduced from above to the higher end of the furnace and to the direct influence of the flame therewithin, the mixture infeed was agitated as an incident of flash combustion during some thirty seconds of transit through the furnace subject to a temperature on the order of one thousand degrees F. The discharge from the furnace proved to be magnetically responsive and was processed through a magnetic separator with recovery of a concentrate assaying 59.08% iron (Fe).

As evidenced by the foregoing examples, the method of the invention is susceptible of expedient practice at the side of ore production to effectively and efficiently condition low-grade, non-magnetic iron ores for advantageous concentration and upgrading in reaction to conventional means and techniques of established economic practicality.

Since changes, variations, and modifications in the criteria hereinbefore assigned to characterize the distinctive steps and phases of the improved method may be had without departing from the spirit of my invention, I wish to be understood as being limited solely by the scope of the appended claims, rather than by any details of the foregoing description.

I claim as my invention:

1. The method of magnetizing naturally non-magnetic ores which comprises grinding said non-magnetic ore to a fineness that it will pass through a screen of 4–200 mesh, then intimately admixing 10 parts of said pulverized non-magnetic ore with approximately 1 part, by volume, of a solid combustible fuel, and thereafter treating said ore-fuel mixture with a reducing flame, at a temperature between about 750° F. and about 1400° F.

2. The method of claim 1, wherein the ore-fuel mixture is in direct contact with the reducing flame for 30–120 seconds.

3. The method of magnetizing naturally non-magnetic ores which comprises grinding said non-magnetic ore to a fineness that it will pass through a screen of 4–200 mesh, then intimately admixing 100 parts of said pulverized non-magnetic ore with approximately 1 part, by weight, of a liquid combustible fuel, and thereafter treating said ore-fuel mixture with a reducing flame, at a temperature between about 750° F. and about 1400° F.

4. The method of claim 3, wherein the ore-fuel mixture is in direct contact with the reducing flame for 30–120 seconds.

References Cited in the file of this patent

UNITED STATES PATENTS

| | | |
|---|---|---|
| 2,184,300 | Hodson et al. | Dec. 26, 1939 |
| 2,240,718 | Schiffman et al. | May 6, 1941 |
| 2,870,003 | Cavanagh | Jan. 20, 1959 |